United States Patent
Omi

Patent Number: 4,614,149
Date of Patent: Sep. 30, 1986

[54] BRAKE BOOSTER DEVICE

[75] Inventor: Atsushi Omi, Anjo, Japan

[73] Assignee: Aisin Seiki Kabushiki Kaisha, Kariya, Japan

[21] Appl. No.: 447,673

[22] Filed: Dec. 7, 1982

[30] Foreign Application Priority Data

Dec. 10, 1981 [JP] Japan .................. 56-198810

[51] Int. Cl.$^4$ .................. F16J 3/02; F01B 19/00
[52] U.S. Cl. .................. 92/98 D; 92/169; 220/4 B
[58] Field of Search .......... 60/547.1; 92/169, 98 D, 92/165 PR, 166; 220/4 B, 5 A, 327, 328

[56] References Cited

U.S. PATENT DOCUMENTS

| | | | |
|---|---|---|---|
| 2,910,770 | 11/1959 | Kachline | 220/4 B |
| 3,080,201 | 3/1963 | Escola | 220/327 |
| 3,216,745 | 11/1965 | Oey | 220/327 |
| 3,738,232 | 6/1973 | Kado | 92/169.2 |
| 4,271,750 | 6/1981 | Thomas et al. | 92/98 D |
| 4,307,570 | 12/1981 | Yardley | 60/547.1 |
| 4,377,069 | 3/1983 | Kobayashi | 60/547.1 |

FOREIGN PATENT DOCUMENTS 2406551 5/1979 France.

*Primary Examiner*—Robert E. Garrett
*Assistant Examiner*—Richard S. Meyer
*Attorney, Agent, or Firm*—Oblon, Fisher, Spivak, McClelland & Maier

[57] ABSTRACT

A brake booster device which includes a front shell having a circular outer periphery, a rear shell having a circular outer periphery and being connected with the front shell to form a booster housing, a power piston diaphragm member disposed within the housing and dividing the same into a constant pressure chamber and a variable pressure chamber, a first pair of opposed sleeve portions provided on the inner peripheral portion of the front shell and extending radially inwardly to thereby form a figure 8 shape in the interior of the front shell, a second pair of opposed sleeve portions provided on the inner peripheral portion of the rear shell and extending radially inwardly to thereby form a figure 8 shape in the interior of the rear shell and a rod member interconnecting each of the first and second pairs of sleeve portions and which is inserted thereinto.

11 Claims, 7 Drawing Figures

BRAKE BOOSTER DEVICE

BACKGROUND OF THE INVENTION

This invention relates generally to a brake booster and more particularly to a brake booster having a front and a rear shell housing which are connected to each other.

DESCRIPTION OF THE PRIOR ART

French Pat. No. 2,406,551 discloses a brake booster housing. However, the plastic housing has a complex structure which regard to performing a sealing function and is therefore costly to manufacture.

SUMMARY OF THE INVENTION

It is an object of the present invention to provide a brake booster having a figure 8 shape at the interior of the brake booster housing with a circular outer periphery by providing a pair of inside sleeve portions through which a connecting member is inserted for securing the front and rear shells of the housing. The housing is made of lightweight resinous material.

Another object of the invention is to provide an improved booster having a pair of detent portions provided on a power piston in the housing and extending from the outer surface of the inside sleeve portions in the rear shell onto the outer surface of the sleeve portions in the front shell for preventing rotation of the power piston to thereby maintain predetermined clearance between the sleeve portions and the power piston for allowing a deformation of a diaphragm member in the housing.

It is a further object of the invention to provide an improved booster having a space formed in the diaphragm member for preventing the space formed by the sleeve portions and a circular inner periphery of the housing from having water or other exterior objects enter thereinto.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding part throughout the several views and wherein.

DETAILED DESCRIPTION OF THE PREFERRED EMBODIMENTS

Figure 1:
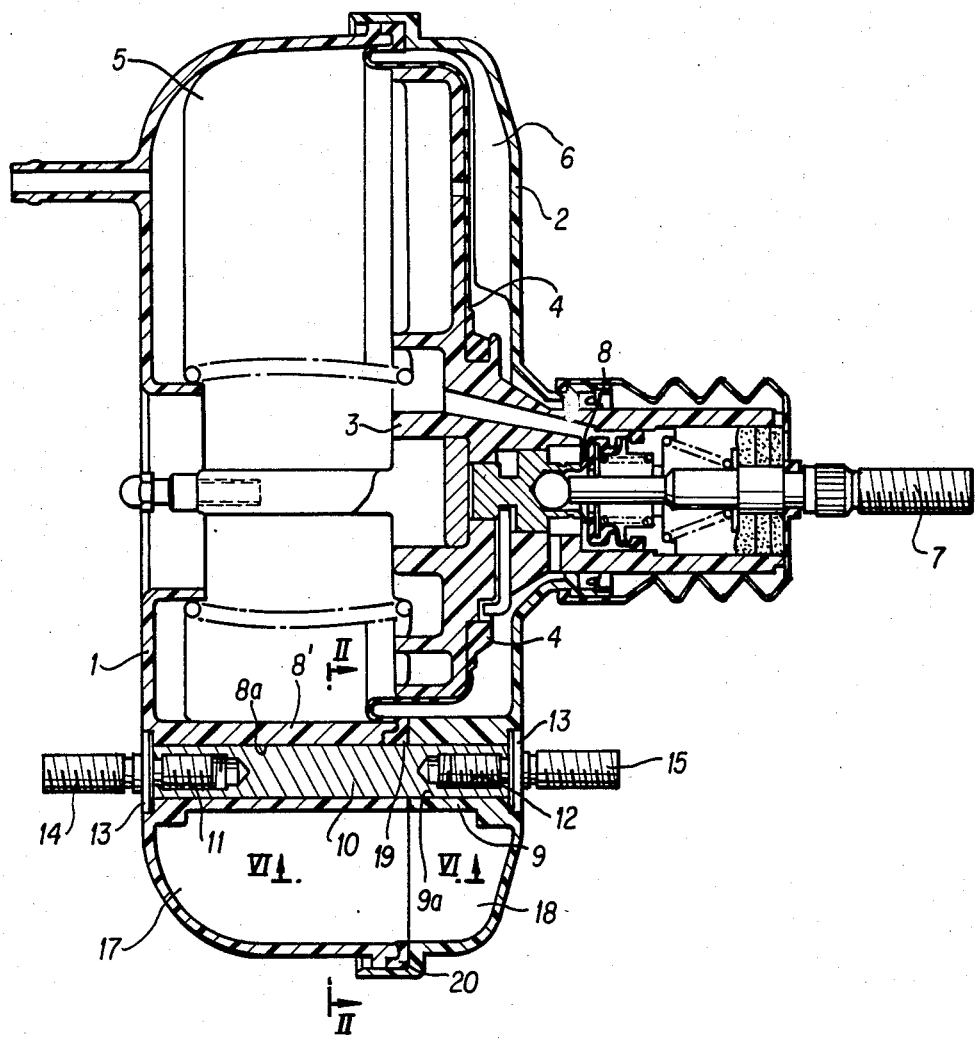
FIG. 1 is a cross-sectional view of a brake booster device according to the invention.

FIG. 1 shows an embodiment of the invention wherein number 1 designates a front shell having a circular outer periphery and made of a plastic material such as a resinous material, and number 2 designates a rear shell having a circular outer periphery and of the same material. Both shells 1, 2 are connected together so as to form a vacuum booster housing. A resinous power piston 3 and diaphragm member 4 are disposed within the housing for defining a vacuum chamber 5 and a variable pressure chamber 6. The variable pressure chamber 6 is alternatively connected to the vacuum chamber 5 and to atmospheric pressure through the operation of control valve 8. Number 7 designates a push rod one end (i.e., right end) of which is operatively connected to a brake pedal (not shown) and the other end of which is connected with the control valve 8 for operating the same.

Figure 7:
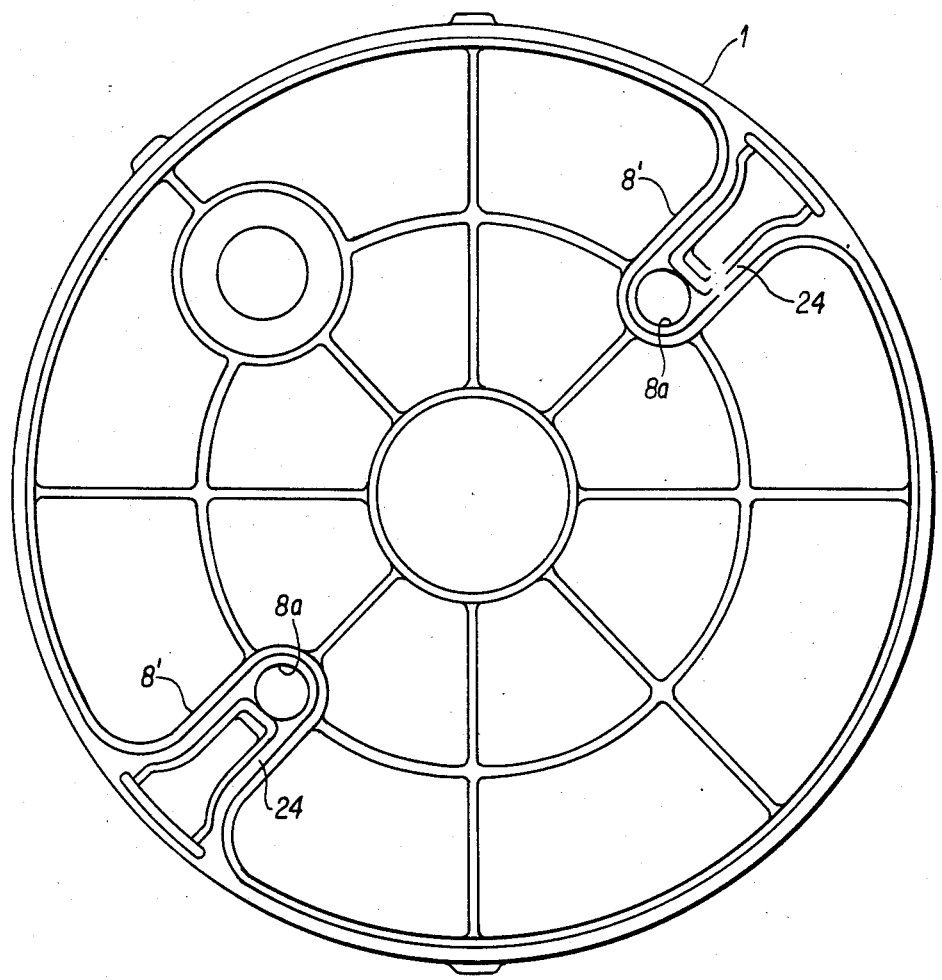
FIG. 7 is a plane view of a front shell of the present invention as seen from the interior thereof when disassembled.

As is shown in FIGS. 1 and 7, the front shell 1 has a pair of inwardly opposed sleeve portions 8', 8' at a circular inner periphery thereof so that interior of the front shell 1 has a figure 8 shape formation (see FIG. 7). Similarly, the rear shell 2 includes a pair of inwardly opposed sleeve portions 9, 9 at a circular inner periphery thereof, and the inside of rear shell 2 is of a figure 8 shape.

Each sleeve 8' and 9 is provided with cylindrical holes 8a and 9a within which a rod 10 is inserted. Opposite ends of the rod 10 are provided with threaded holes 11, 12 in which bolts 14, 15 are theadedly engaged for securing the rod 10 to the shells 1 and 2 to thereby completely and rigidly connect the two shells 1, 2 together. Number 13 designates flanges which are fitted into the spot facing provided on the shells 1 and 2. The bolts 14 are also used for connecting the master cylinder (not shown), and the bolts 15 are used for connecting the vacuum booster to the vehicle body (not shown).

Figure 2:
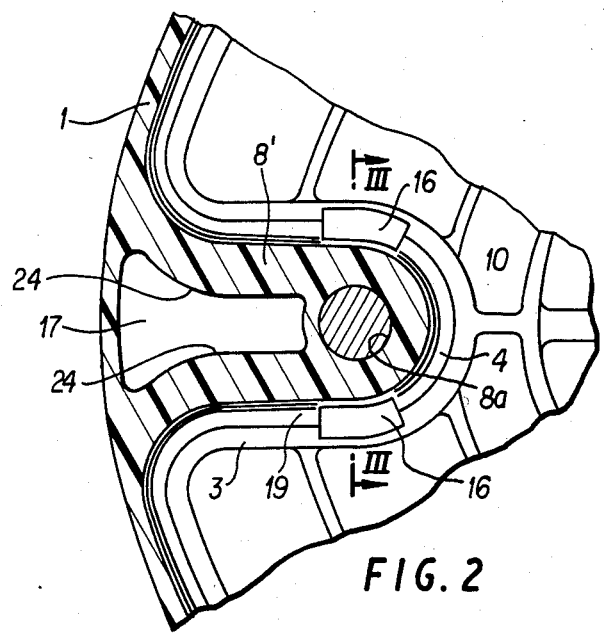
FIG. 2 is a cross-sectional view taken along the line II—II of FIG. 1.
Figure 3:
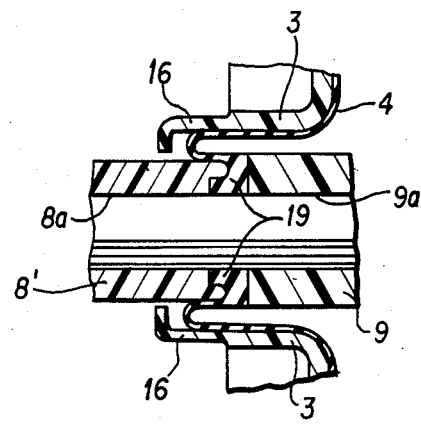
FIG. 3 is a cross-sectional view taken along the line III—III of FIG. 2.

As shown in FIGS. 2 and 3, the power piston 3 and diaphragm member 4 have portions thereof fitted with sleeves 8', 9. Detent portions 16, 16 are provided on the power piston 3 and extend over to the outer surface of the sleeve 8', 8' for preventing relative rotation therebetween.

Sealed spaces 17, 18 are formed by the sleeves 8', 9, connecting portions 24, 24 of sleeve 8' and corresponding connecting portions (not shown) of sleeve 9 circular inner peripheries of the shells 1, 2. As stated earlier, the shape of the diaphragm member 4 is designed to fit with the sleeves 8', 9, and also the diaphragm member 4 has a plurality of projections 19 which are secured between the sleeves 8, 9 as shown in FIG. 3.

Figure 4:
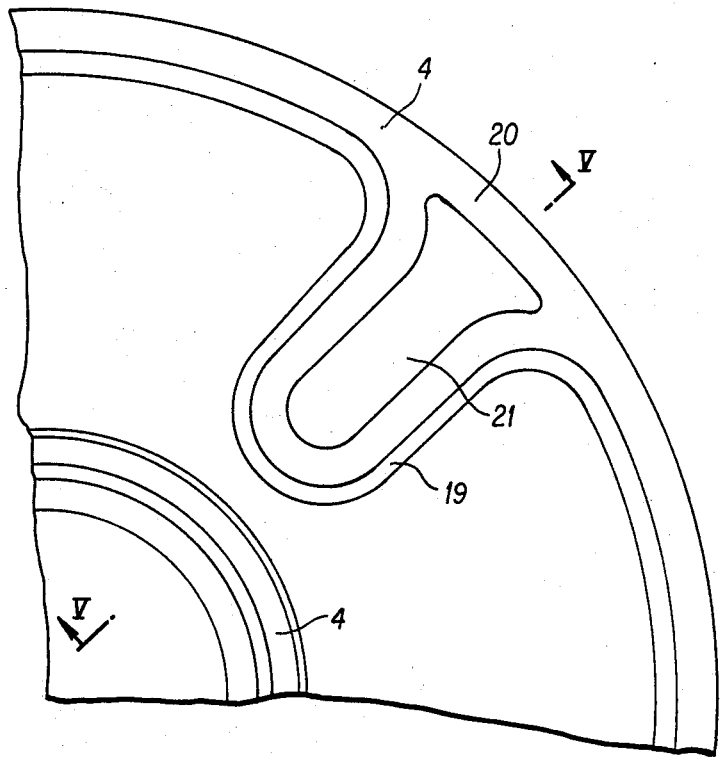
FIG. 4 is a plan view of a diaphragm member showing only one quarter portion thereof.
Figure 5:
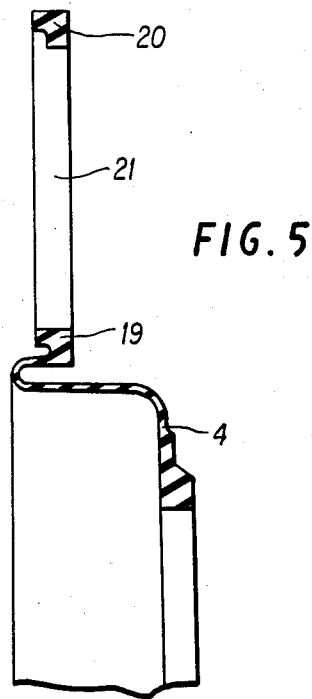
FIG. 5 is a cross-sectional view taken along the line V—V of FIG. 4.
Figure 6:
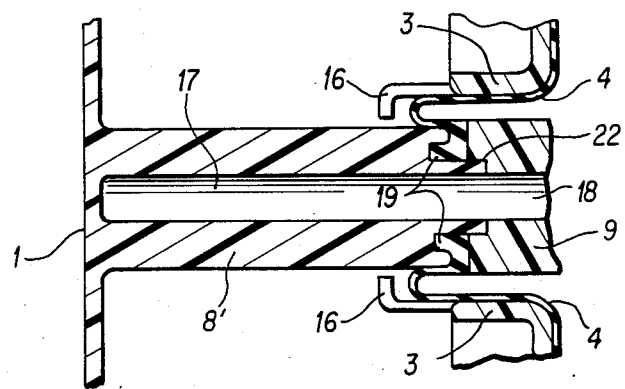
FIG. 6 is a cross-sectional view taken along line VI—VI of FIG. 1.

Within the projections 19 of the diaphragm member 4 is formed sealed spaces 21 which is similar to the space 17, 18 in size and shape. Number 20 in FIGS. 4 and 1 designates the outer circumferential portion of the diaphragm member 4. As shown in FIG. 1, portion 20 is secured between the front and rear shells 1, 2. In order to coaxially connect the front and rear shells 1, 2, it is preferable to have fitting connection 22 disposed therebetween as shown in FIG. 6.

Each common rod 10 is used for receiving a reaction force from the master cylinder through the bolts 14, which will therefore avoid damages to the shells.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by Letters Patent is:

1. A brake booster device comprising:
   (a) a front shell having a circular outer periphery and an inner peripheral portion;
   (b) a rear shell having a circular outer periphery and an inner peripheral portion, said rear shell being sized and shaped to interengage with said front shell to form a booster housing;
   (c) an axially movable power piston disposed within said booster housing;
   (d) a diaphragm member disposed within said booster housing, said diaphragm member serving to divide said booster housing into a constant pressure chamber and a variable pressure chamber;
   (e) at least two front sleeve portions, each of said at least two front sleeve portions being connected to said front shell by a front connecting portion which extends radially inwardly from said inner peripheral portion of said front shell;
   (f) at least two rear sleeve portions, each of said at least two rear sleeve portions being connected to said rear shell by a rear connecting portion which extends radially inwardly from said inner peripheral portion of said rear shell, each of said at least two rear sleeve portions being sized, shaped, and positioned to interengage with a corresponding one of said at least two front sleeve portions to form a single, continuous sleeve extending axially through said booster housing, each of said single, continuous sleeves containing a continuous throughhole which is exterior of said pressure chamber and interior of said shells;
   (g) a rod member inserted into each of said continuous throughholes, each of said rod members being connected at its front end to said front shell and at its rear end to said rear shell.

2. A brake booster device as recited in claim 1 wherein said front and rear shells are both made out of a resinous material.

3. A brake booster device as recited in claim 2 wherein said at least two front sleeve portions, said front connecting portions, and said front shell are all molded integrally.

4. A brake booster device as recited in claim 2 wherein said at least two rear sleeve portions, said rear connecting portions, and said rear shell are all molded integrally.

5. A brake booster as recited in claim 1 wherein each of said radially extending rear connecting portions is sized, shaped, and positioned to interengage with a corresponding one of said radially extending front connecting portions.

6. A brake booster device as recited in claim 5 wherein:
   (a) each of said connecting portions contains a central empty space and
   (b) the empty space in each of said connecting portions communicates at its axial inner end with a corresponding empty space in the one of said connecting portions interengaging therewith.

7. A brake booster device as recited in claim 5 wherein:
   (a) the radially outer periphery of said diaphragm member is circular;
   (b) said diaphragm member contains at least two radially inwardly extending portions sized, shaped, and positioned to be clamped between each pair of interengaging front and rear sleeve portions and between each pair of interengaging front and rear connecting portions; and
   (c) each of said at least two radially inwardly extending portions of said diaphragm contains a throughhole sized, shaped, and positioned to pass one of said rod members.

8. A brake booster device as recited in claim 5 wherein said diaphragm member has a radially inner periphery which is connected sealingly to said axially movable power piston and a radially outer periphery which is gripped sealingly between said front shell and said rear shell, between each pair of interengaging front and rear sleeve portions, and between each pair of interengaging front and rear connecting portions.

9. A brake booster device as recited in claim 1 wherein each of said rod members is bolted at its front end to a front flange seated in said front shell and is bolted at its rear end to a rear flange seated in said rear shell.

10. A brake booster device as recited in claim 1 and further comprising at least one detent member projecting from said power piston, said at least one detent member cooperating with at least one of said sleeve portions to prevent rotation of said power piston relative to said at least one of said sleeve portions.

11. A brake booster device as recited in claim 1 wherein each of said continuous throughholes is pneumatically isolated from said variable pressure chamber.

* * * * *

UNITED STATES PATENT AND TRADEMARK OFFICE
CERTIFICATE OF CORRECTION

PATENT NO. : 4,614,149
DATED : SEPTEMBER 30, 1986
INVENTOR(S) : ATSUSHI OHMI

It is certified that error appears in the above—identified patent and that said Letters Patent is hereby corrected as shown below:

In column 1, line 48, delete "part" and insert --parts--;

In column 2, line 28, delete "theadedly" and insert --threadedly--;

In column 2, line 44, delete "9 circular" and insert --9, and circular--;

In column 2, line 49, delete "8,9" and insert --8',9--;

In column 2, lines 51-52, delete "sealed spaces 21 which is similar to the space 17,18" and insert --space 21 which is similar to the sealed spaces 17,18--;

In column 3, line 33, delete "chamber" and insert --chambers--;

In column 1, line 61, delete "plane" and insert --plan--.

Signed and Sealed this

Fifth Day of January, 1988

Attest:

DONALD J. QUIGG

*Attesting Officer*    *Commissioner of Patents and Trademarks*